United States Patent [19]

Aminzadeh et al.

[11] Patent Number: 5,079,749
[45] Date of Patent: Jan. 7, 1992

[54] SEISMIC RAYTRACING METHOD AND APPARATUS

[75] Inventors: Fred Aminzadeh, Anaheim Hills; Christopher K. Von Kahrs, Fullerton; Keith H. Wrolstad, Corona, all of Calif.

[73] Assignee: Union Oil Company of California, Los Angeles, Calif.

[21] Appl. No.: 534,464

[22] Filed: Jun. 6, 1990

[51] Int. Cl.$^5$ .............................................. G01V 1/30
[52] U.S. Cl. ........................................ 367/73; 367/38
[58] Field of Search ............................ 367/38, 73, 36; 364/421

[56] References Cited

U.S. PATENT DOCUMENTS

| | | | |
|---|---|---|---|
| 4,209,843 | 6/1980 | Hyatt | 364/724 |
| 4,246,652 | 1/1981 | Khan | 367/42 |
| 4,314,347 | 2/1982 | Stokely | 364/574 |
| 4,415,999 | 11/1983 | Noeckel et al. | 367/73 |
| 4,553,221 | 11/1985 | Hyatt | 364/724 |
| 4,780,859 | 10/1988 | Hadidi et al. | 367/43 |
| 4,882,713 | 11/1989 | Hughes | 367/47 |
| 4,884,247 | 11/1989 | Hadidi et al. | 367/43 |
| 4,905,204 | 2/1990 | Hughes | 367/62 |
| 4,953,140 | 8/1990 | Dablain | 367/73 |

OTHER PUBLICATIONS

"Exact inversion of plane-layered isotropic and anisotropic elastic media by the state-space approach," by Meadows and Coen, Geophysics, vol. 51, Nov. 11, 1986, pp. 2031-2050.
"State Space Modeling of Time Series," by Aoki, 1987, pp. 3-B.
VESPA TM Viscoelastic Seismic Profile Algorithm, "Sierra Geophysics Exploration Software," 7 page brochure.
"SOLID: Seismic Elastic Modeling," Geophysical Development Corporation, Tex., 4 page brochure.
"Non-Normal Incidence State Space Model for Layered Media Systems", by F. Aminzadeh, Phd Dissertation, University of Southern California, Sep. 1979.
Normal Incidence layered system state-space models which include absorption effects, by F. Aminzadeh and Jerry M. Mendel, Sep. 17, 1981.

*Primary Examiner*—Ian J. Lobo
*Attorney, Agent, or Firm*—Gregory F. Wirzbicki; William O. Jacobson

[57] ABSTRACT

A seismic ray-tracing model performs economic exploration of subsurface structures, which 1) allows amplitude, frequency, mode, and other "synthetic filtering" of the model's calculations and 2) allows model interpolations, approximations, and other "synthetic sensitivity" terminations of ray-tracing calculations. The model output can be directly matched to the filtration and sensitivity of actual seismic data. The model structure is capable of the extensive calculations similar to current extensive forward models, but ray-tracing calculations are accomplished in discrete pairs (allowing interpolation between divergent ray pairs and partially simulating detector sensitivity) and ray-tracing calculations are terminated if an amplitude under a threshold level signal strength is encountered. The amplitude threshold level can be set to match filtering used on actual seismic data. This sensitivity and filter matching achieves maximum reliability while still avoiding unnecessary calculations, e.g., avoids redundant single ray calculations and calculations which produce synthetic signals below the filtered sensitivity of the recording instrument. The present invention can also limit and control mode conversions (further speeding calculations), include a time-domain absorption operator dependant only on the wave path and wave mode, allow perturbation modeling, and can specifically identify each event in the synthetic signals via color coded graphics and/or a printed list referenced by apparent velocity ($V_{RMS}$) and zero-offset intercept time.

21 Claims, 5 Drawing Sheets

(DETAIL #1)

(DETAIL #3)

(DETAIL #2)

SEISMIC RAYTRACING METHOD AND APPARATUS

FIELD OF THE INVENTION

This invention relates to exploration of hidden or subsurface structures by the analysis of seismic data from a seismic event. More specifically, the invention concerns a method to determine commercial interest in a layer within an underground formation by comparing seismic data to a numerical simulation.

BACKGROUND OF THE INVENTION

Many natural resource industry activities involve exploration for resources, such as oil, within a subterranean formation. One commonly used exploration method is to analyze surface seismic data from receivers responding to a man-made shock to the subterranean formation, such as an explosive detonation. Different response modes, such as compression and shear waves, are detected by receivers, called seismometers or geophones. By analysis and comparing the characteristics of the measured signals (e.g., mode, amplitude, phase, frequency, and arrival times) to the characteristics of simulated or synthetic signals (derived from a numerical model), some potential resources of commercial interest can be identified. These commercially interesting portions of the subterranean structure may then be further explored or natural resources recovered by methods such as drilling.

The objective of the seismic method is to estimate the in-situ properties of one or more underground layers in a zone of commercial interest. These layers are typically sandwiched between shoulder beds immediately over- and under-lying the layers of commercial interest (i.e., the surrounding beds are not of commercial interest). In addition, seismic signals may have to travel through other layers not of commercial interest to reach the geophones. These layers can refract, change the signal's propagation speed and amplitude, change signal mode, attenuate transmitted signals and generate additional signals (including reverberatory events called multiples). The analysis of seismic signals must therefore distinguish between these many factors.

Seismic analysis has essentially been accomplished in 3 steps. Different layer parameters (e.g., density, compressional wave velocity and shear wave velocity) are first blocked into inferred discrete layers. The inferred layers may be a result of other information and data, such as well drilling core samples, well logs, and surface geological observations. An estimate of average density and wave propagation velocities (for each mode) within each inferred layer is used in conjunction with regression analysis to construct a discrete model representing the subsurface physical characteristics. The second step is to produce a synthetic seismic response from the discrete model and compare it to the actual field response. Erroneously modeled layers are detected by comparison discrepancies. The final step revises the discrete model and generates another synthetic seismic response. The process is iterated until comparison discrepancies are no longer significant.

One type of lithology, such as a simple sedimentary structure, contains nearly horizontal layers. However, existing seismic analysis methods must contend with many factors from even a simple lithology. These include: 1) multiple non-homogeneous layer interfaces within the zone of interest which attenuate and convert signals of interest and/or produce unwanted signals and wave conversions; and 2) intervening (e.g., near surface) layers producing additional signals (e.g., multiple reflections) which further attenuate and convert signals of interest from one mode to another.

Actual lithological structures are more complex than the aforementioned simple lithology. Complex structures create a profusion of difficult-to-interpret seismic data signals. A viscoelastic forward model to simulate every signal independent from their amplitude and attenuation would typically be uneconomically large and require uneconomic operating expenses (e.g., long run time on a computer). Therefore, discrete forward modeling simplifications are common.

One approach to model simplification is point-source ray tracing. This method concentrates on one or more important geological features (e.g., a layer of commercial interest). A modification of this approach models discrete event branching of signals, but continues to limit the number of geological features modeled. This branched approach may redundantly calculate a ray path if involved in several branches (i.e., events).

Another method may not limit the number of layers, but limits or suppresses types of numerical simulation (i.e., model) calculations. For example, surface waves, mode conversions, and multiple reflective types of calculations can be suppressed. Phase velocity and frequency attenuation windows can also narrow/limit calculations to further simplify the model.

However, model simplification creates problems when comparing a simplified synthetic response to actual seismic data. Limiting the number of layers or types of calculations can mask synthetic signals and/or prevent the generation of synthetic seismic signals from an exact subset of events. The simplified models also do not identify the contribution of each event to the signal, i.e., the model is not capable of fully identifying the nature, origin, and type of event causing some specific signal in the simulated response.

One current method attempts to exclude or filter out unwanted effects in the actual data so that comparison to the simplified model response can be made more easily. Filtering has involved limiting the frequency bandwidth of signals, the response time (e.g., avoiding first-to-arrive surface waves), or the number of events.

However, too much data filtering may mask geological features. Conversely, too much simplification of the model may produce results incapable of being matched with the actual or field seismic response data. In order to obtain a reasonable assurance of valid results, very little filtration and extensive calculations must be accomplished, e.g., a high absolute number of layers and a wide frequency band window to attain a high level of reliability. Even extensive calculations may not generate a proper simulation if even one critical simplification/suppression (e.g., a narrow time window) is included. Still further, the extensive calculations can be unreliable, generating extraneous signals.

Matching seismic data may also be difficult due to sensor accuracy/sensitivity. An extensive model may generate signals below the sensitivity of the data collection system. In addition, the repeatability/accuracy of the data collection system may not produce results which match the synthetic data from the model.

None of the current simplified model approaches known to the inventors have the capability of producing synthetic data with an exact subset of events specified by the user. Additionally, no other method is capable of identifying the nature, origin, and type of events in the simulated result to the extent possible in this method. Still further, the method eliminates the risk of masking an important part of the synthetic signals. Finally, no other simplified/suppressed numerical simulation is capable of accurately simulating the filtered seismic data with comparable computer usage efficiency.

SUMMARY OF THE INVENTION

The present invention overcomes these past problems/limitations by providing 1) a seismic forward model which terminates some of the model's calculations (i.e., synthetic filtering of synthetic signals) according to the actual filtering, desired accuracy and/or event type and 2) model interpolations, approximations, and other "synthetic data sensitivity/accuracy" limits to simplify the calculations. The model now can directly match the filtered field seismic data. The model structure is capable of the extensive calculations similar to current extensive models, but synthetic filtering and sensitivity approximations, such as paired ray-tracing calculations (allowing approximating interpolations between divergent ray pairs) and amplitude thresholds, simplify calculations. The divergence increment (angle) between ray airs and the amplitude threshold level can be set to match filtering used on seismic data and the sensitivity/accuracy of the actual data sensors. This achieves maximum reliability while still avoiding unnecessary calculations, e.g., avoids calculations which produce synthetic signals below the practical sensitivity of the recording instrument. The present invention also avoids multiple overlapping branched calculations, limits and controls mode conversions (further speeding calculations), includes a time-domain absorption operator dependent only on the wave path and wave mode, and allows perturbation modeling.

The present invention is applicable to several phases of exploration. It is capable of quick scan applications (e.g., simulating major lithological features and comparing synthetic response data to highly filtered data) and later more detailed seismic investigations of zones of interest. It produces reliable and cost effective results consistent with the level of filtered data it is compared to. It is also capable of distinguishing different wave types by a color coding process that gives a visual display of event types and their relative amplitudes.

BRIEF DESCRIPTION OF THE DRAWINGS

In these Figures, it is to be understood that like reference numerals refer to like elements or features.

DETAILED DESCRIPTION OF THE INVENTION

FIG. 1 shows possible elastic events at a layer interface 2 within a subsurface zone of interest. The preferred application of the method is a sedimentary or other generally planar layer, but other types of lithology, structures and substructures can be modeled. FIG. 1a shows a compression-mode pressure wave or ray P from a source at an incidence angle of $\theta$ from a vertical axis V. The wave or ray can be considered a discrete vector representation of a disturbance impressed on the layer. The pressure wave P is typically generated from an explosive seismic source detonated at or near the surface (not shown). Pressure rays, such as ray P shown, are the modeled state-space discrete representations of the components of a continuous spherical wave front radiating in a generally downward and outward direction from the surface seismic event source.

Figure 1A:
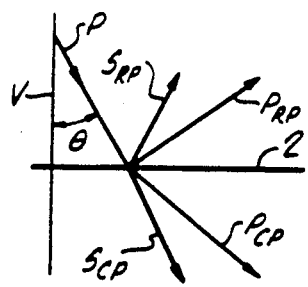
FIG. 1a–1d show a schematic view of the partition incident seismic rays.
Figure 1B:
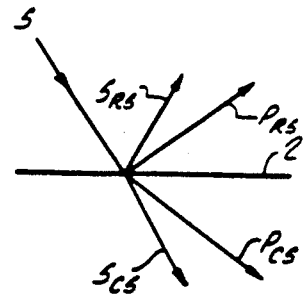

The incident compression-mode pressure ray P upon intersecting the layer interface 2 may partially convert to another mode, for example reflecting a shear mode wave $S_{RP}$ and another compression-mode pressure wave $P_{RP}$. A portion of the pressure waves are also downwardly conducted, resulting in conducted shear wave $S_{CP}$ and conducted compression wave $P_{CP}$ portions. FIG. 1b shows a similar pattern for reflection and conduction of a shear wave S at interface 2. Upon intersecting with the layer interface 2, the downwardly radiating shear wave S produces multiple reflected rays $S_{RS}$ and $P_{RS}$, and multiple conducted rays $S_{CS}$ and $P_{CS}$.

Figure 1C:
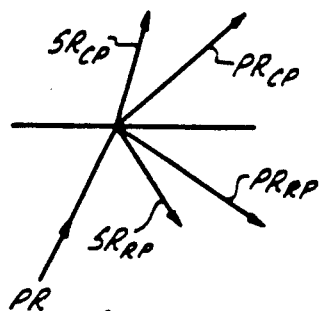
Figure 1D:
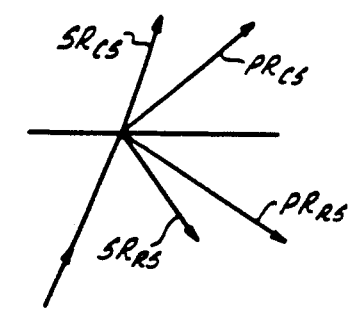

Upwardly radiating compression and shear pressure rays PR and SR shown in FIGS. 1c and 1d can originate from reflections from a lower lithographic structure. They produce upwardly conducting shear and compression pressure waves $SR_{CP}$, $PR_{CP}$, $SR_{CS}$, and $PR_{CS}$, and downwardly reflect pressure waves $SR_{RP}$, $PR_{RP}$, $SR_{RS}$, and $PR_{RS}$.

The incident rays P or S are essentially broken into many new parts at the interface. The parts are a function of layer density differences, velocity differences, mode, incidence angle/offset, losses, and interface surface properties. The portion of an incident ray diverted to one of the specific new parts can be characterized as the partitioning factor for that part. The sum of the partitioning factors defines how the incident ray is disassembled into its new parts.

Partial mode conversions of shear waves to compression pressure waves (and vice versa) is shown in FIG. 1, but may not always occur. Although the amplitude of the reflected and conducted rays is typically decreased when compared to the downwardly radiating pressure waves P or S, mode conversion amplitude is typically further reduced.

Emergence angles of reflection and conduction (angle of new vectored rays with respect to the vertical axis, not shown but similar to incidence angle shown in FIG. 1) vary at each interface location. Thus, even a single source ray in a multi-layered structure can generate multiple discrete rays to a single, fixed location receiver. Since spherically radiated sets of rays from a seismic source (i.e., multiple discrete rays representing a continuous wave) in a multi-layered structure are common, data at a single receiver is typically the result of multiple events or rays.

Figure 2:
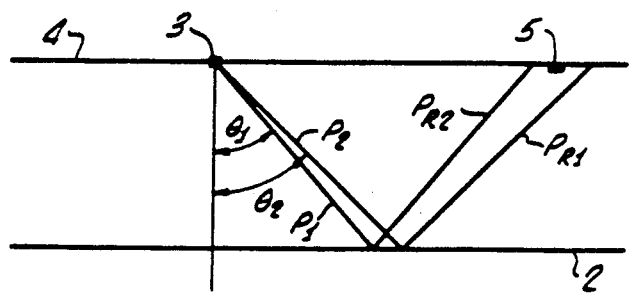
FIG. 2 is a schematic cross-sectional view of a pair of radiating pressure rays.

FIG. 2 is a schematic cross-sectional view of a pair of pressure rays $P_1$ and $P_2$ radiating from a seismic source 3 near a top surface 4. The pair of rays at angles of incidence $\theta_1$ and $\theta_2$ to the vertical are the incremental discrete representations of the continuous, radially emanating pressure wave. A portion of the discrete reflected rays $P_{R1}$ and $P_{R2}$ emanate from the interaction at lithology structure or layer 2. As shown, neither of the pair of discrete reflected rays $P_{R1}$ and $P_{R2}$ intersect with a receiver 5, but if the incremental angle (i.e., difference between $\theta_1$ and $\theta_2$) is small enough, a linear or other continuous interpolation can provide a reasonably accurate representation of the data signal generated by the receiver 5 actually intersecting with a ray path.

Simultaneous processing of ray-tracing pairs require two sets of layer matrices, offsets, travel times, and divergence coefficients. If instead of a surface detector 5, multiple detectors are located on a vertical axis (defined as a Vertical Seismic array of Profile, VSP), data processing will require at least a two-dimensional ray-interval (i.e., offset and depth).

The signal at any receiver 5 location is a function of the lithology features traveled by the multiple event signals. This may involve mode conversions, reflections, and multiple reflections/transmissions (e.g., a ray is conducted to a lower level and reflected from the lower subterranean level and reflects twice more before reaching the surface). The plurality of seismic signals, numerical simulation model and synthetic seismic signals, and comparison calculations require a large calculation and data storage capability.

In the preferred embodiment, a computer or microprocessor having two major information storage areas is used to generate synthetic seismic signals from the paired ray numerical simulation. The first storage area contains layer numbers (or other unique identifications) and event-type information for every element not yet branched. This can be considered an active and/or current event list, wherein every lithological structure capable of generating a significant signal (e.g., comparable to filtered seismic response data) is included in the model. The active event list also includes an effective amplitude of the active event and a sum of its spherical divergence factors.

A second major area of storage is an event history table. When an event reaches the surface (or other detector location layer), its history is stored in the event history table. Stored information includes a variable length event history and angle indexes over which an event exceeded the significance level.

Numerical operating functions of the analysis method can be incorporated into microprocessors holding the stored data or accomplished by separate microprocessors. Each event and ray is traced from its source unless calculation is terminated. Major functions during this ray-tracing analysis are calculating travel time and location, especially offset, of rays.

A table of layer attributes of time and offset for each mode type for every incident angle is required. The tabular data is used to construct the complete set of paired offsets and times that determine an event's root mean squared (RMS) velocity hyperbola. The RMS velocity hyperbola is calculated using the linear best-fit line through offset-squared and time-squared data pairs. RMS velocity is the square root of the inverse slope of this best fit line.

An overall flow chart of the logic managing and analyzing the numerical simulation is shown in FIGS. 3a through 3d. The numerical manipulations and logic to manage the large numbers of events/rays, interfaces, layer, materials, critical angles, optimal storage/retrieval corrections is potentially extensive, but the model's flowchart allows significant simplification without compromising accuracy of the comparison to actual seismic data.

Figure 3A:
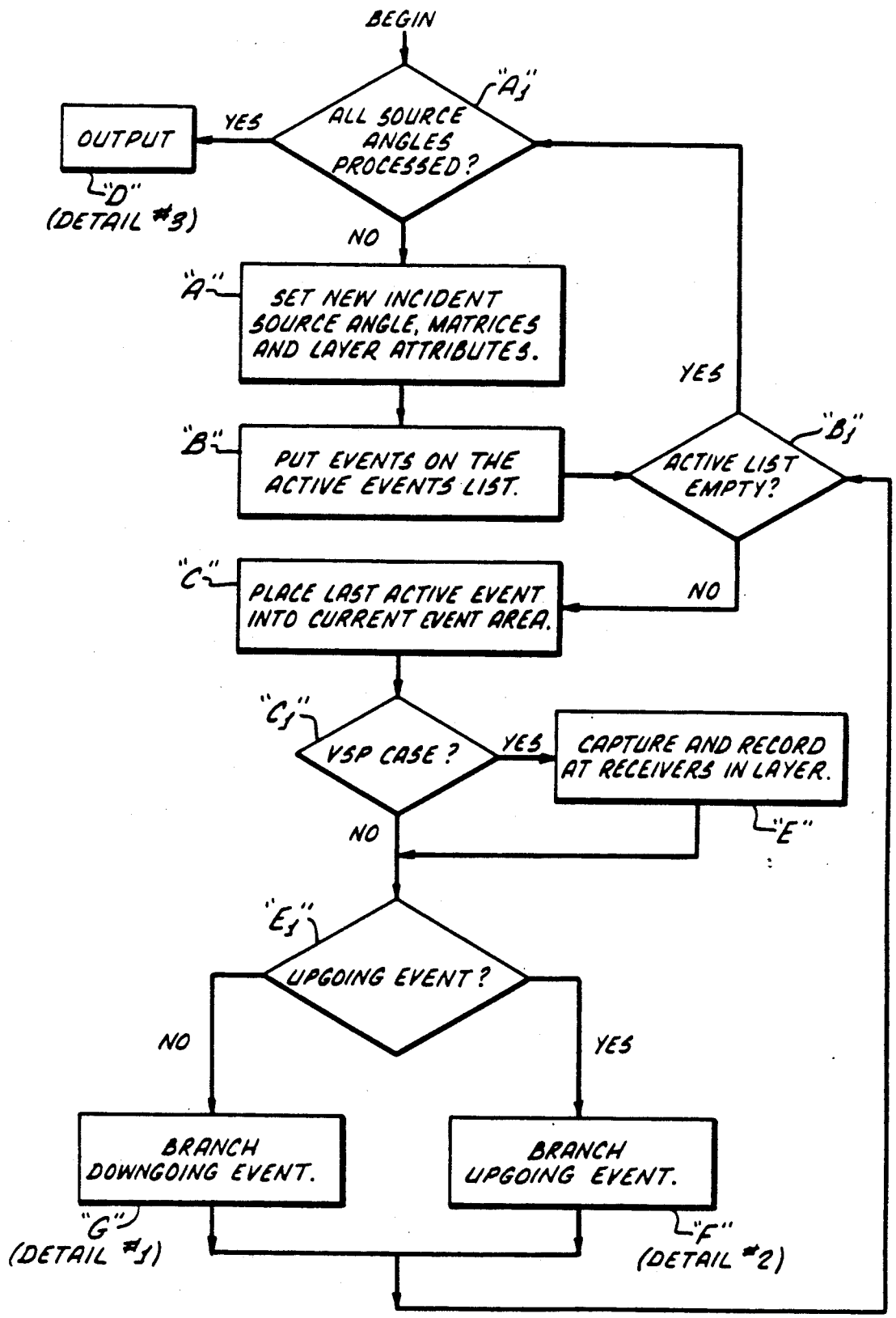
FIGS. 3a–3d show a flow chart of a method of analyzing these signals.

FIG. 3a shows the main flowchart for the method. A discrete ray (see FIG. 1) from a source event is identified in block "A", initially from a source such as a detonation. Incidence angle and incremental incidence angles for a current paired ray/event are selected, along with layer attributes and matrix storage location. At block "B," the identified source event is placed/stored on an active events list. At block "C," the most recently stored active ray/event is placed/stored into the current event list. Down-going and upcoming events/rays are then simulated (i.e., ray-traced) for the current ray/event as it propagates across and reflects at the next interface in its path.

At decision block "$B_1$," if the active event list is empty, a new ray/event (i.e., source ray) is selected at decision Block "$A_1$." If the active list in decision Block "$B_1$" is not empty, the current event list in Block "C" is scanned at decision block "$C_1$." If the ray/event is part of a Vertical Seismic Profiling (VSP) case, ray/event is captured and recorded at a subterranean layer of the discrete model at block "E." Layers are typically vertically displaced from one another.

Figure 3B:
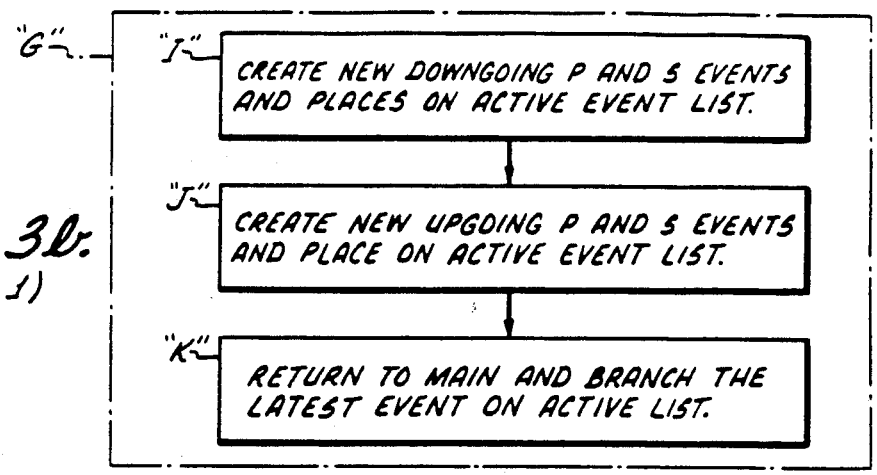

Another decision block "$E_1$" is then entered. If the current incident event/ray is upcoming, analysis flows to Block "F," where specific ray-tracing analysis is accomplished as shown in FIG. 3c. If not an upcoming source event, analysis flows to Block "G," where more specific ray-tracing analysis is accomplished as shown in FIG. 3b. Once the active list is empty at decision block "$B_1$" and all source angles are processed at decision block "$A_1$," results are transmitted to output block "D" detailed in FIG. 3d.

FIG. 3b shows the process of analysis of a branch down-going incident ray. Block "I" creates new down-going branched events resulting from the intersecting of the down-going incident source with the structure. These branches represent new down-going portions which result from the ray interaction with the modeled structure. Down-going branches have an identified mode, amplitude, direction, and location (e.g., offset). The new event/rays are then added to the active event list (see block "B" of FIG. 3a) at block "K." Mode conversion control/limits may also be applied at Block "I."

Similarly, new upcoming branched rays are created at Block "J." The new upcoming event/rays are then added to the active event list (see block "B" of FIG. 3a) at Block "K." Mode conversion control/limits may also be applied at Block "J."

When a threshold amplitude level is provided, all of the new upcoming and down-going event/rays at Blocks "I" and "J" can be compared to this threshold level. If the new event/ray is less than the threshold level, that ray-tracing analysis is terminated. This threshold allows calculation only of significant rays.

The threshold can be fixed or based upon resulting signal strength (and filtering) of the surface (or VSP) receiver/geophone data. For example, a signal at depth may have a detectable amplitude, but attenuation may reduce the amplitude prior to detection at the surface. By basing the threshold at model's surface layer calculations (see FIG. 3c, Step "M"), or basing the threshold at depth on larger amplitudes sufficient to compensate for attenuation, the model can limit calculations and produce synthetic signals matched to the (filtered) sensitivity of the actual seismic data. Thus, every forward model structure/event can be initiated regressively or end point tested. Calculations are terminated prior to or upon reaching the detector for those rays of insufficient amplitude to be detected on filtered seismic data.

Branching ray-tracing is therefore accomplished with flexible storage of event attributes, including angle indexes to a layer attribute table. This allows for the construction of a complete move-out curve. A move-out curve can be defined as travel time versus offset. All detectable events above a given threshold or significance level are therefore generated. This includes a travel-time hyperbola analysis and an offset-amplitude sum calculation. Travel-time hyperbola is defined as best-fit to the move-out curve. A sample offset-amplitude sum calculation is the sum of the recorded amplitudes for every receiver that was intersected by a ray path, or interpolated ray path, of the specific event.

FIG. 3c show a similar analysis method for branched upcoming rays, but modified for additional termination provisions. As shown in decision block "L," if the event/ray has entered the topmost layer, event is captured and a simulated geophone response portion generated at block "M," e.g., a threshold level simulating filtered data. The capture calculations include spherical divergence attenuation, so that the portion calculated can be combined with other response portions intersecting the receiver at other angles.

Block "M" represents a major information capture step in the analysis and production of a synthetic seismogram. Geophone- response equations are as follows:

$$P_v = \cos(\theta_p) A_p \quad (a)$$

$$P_h = \sin(\theta_p) A_p \quad (b)$$

$$S_v = \sin(\theta_s) A_s \quad (c)$$

$$S_h = -\cos(\theta_s) A_s \quad (d)$$

where:
$P_v$ = compressional wave vertical component response;
$P_h$ = compressional wave horizontal component response;
$\theta_p$ = angle of emergence of compressional wave;
$\theta_s$ = shear wave emergent angle;
$S_v$ = shear wave vertical component response;
$S_h$ = shear wave horizontal component response;
$A_p$ = real part of divergence corrected p wave amplitude; and
$A_s$ = real part of divergence corrected s wave amplitude.

Analytical divergence coefficients (e.g., for elastic case) are summed and stored in the model at step "M". Spherical Divergence Attenuation is accomplished as follows:

$$D_p = 1/[\cos \theta_p (O_p^2 + O_p S_p)/V_p]^{\frac{1}{2}} \quad (a)$$

$$D_s = 1/[\cos \theta_s (O_s^2 + O_s S_s)/V_s]^{\frac{1}{2}} \quad (b)$$

where:
$O_p$ = compressional wave offset at receiver;
$O_s$ = shear wave offset at receiver;
$S_p$ = summation of divergence factors, $DP_i$, in ray path;
$S_s$ = summation of divergence factors, $DS_i$, in ray path;
$V_p$ = compressional wave velocity at source depth;
$V_s$ = shear wave velocity at source depth;
$DP_j = S_j[\tan \theta_{p,j}]^3$; $DS_j = S_j[\tan \theta_{s,j}]^3$;
$S_j$ = thickness of layer j;
$\theta_{p,j}$ = angle of p-wave in layer j; and
$\theta_{s,j}$ = angle of s-wave in layer j.

Variable length traversal-path histories are also generated. An example of a traversal-path history is as follows:

$$\{2, 2001, 3004\}$$

where:
2 = number of elements;
2001 = down-going s-wave in layer 1; and
3004 = upcoming p-wave in layer 4.

In order to properly sum incremental wave portions, decision block "N" determines if an event/ray has been previously calculated at a previous angle. If it has, data is stored and updated in the event list at Block "O." Updates of the angle range and the amplitude sum are specifically required at this process step. If event/ray has not been previously calculated at a previous angle, the new event, angle and amplitude is stored in the event table at Block "P."

If the event/ray is not in the topmost layer at decision block "L," ray-tracing is continued at Block "Q." Continued ray-tracing creates new up-coming rays/events/-mode conversions, unless otherwise terminated. Mode conversion control may also be applied at this process step, if desired by the operator.

New down-going events/rays are also created and a return to Block "B₁" (FIG. 3a) to perform any remaining branchings are accomplished at Blocks "R" and "S." New events/rays are added to the active event list and amplitude or multiples controls/thresholds may subsequently terminate ray-tracing. Mode conversion control may also be applied in Block "R."

Figure 3D:
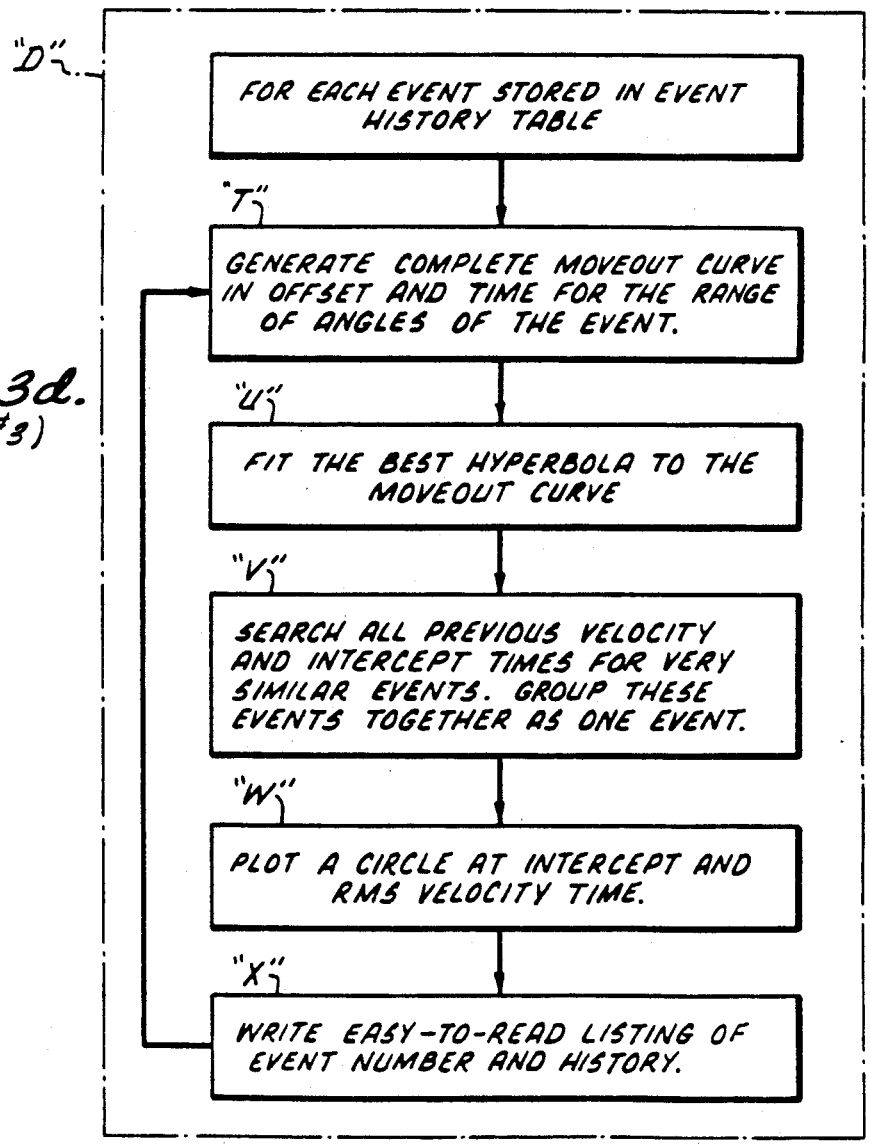
Figure 3C:
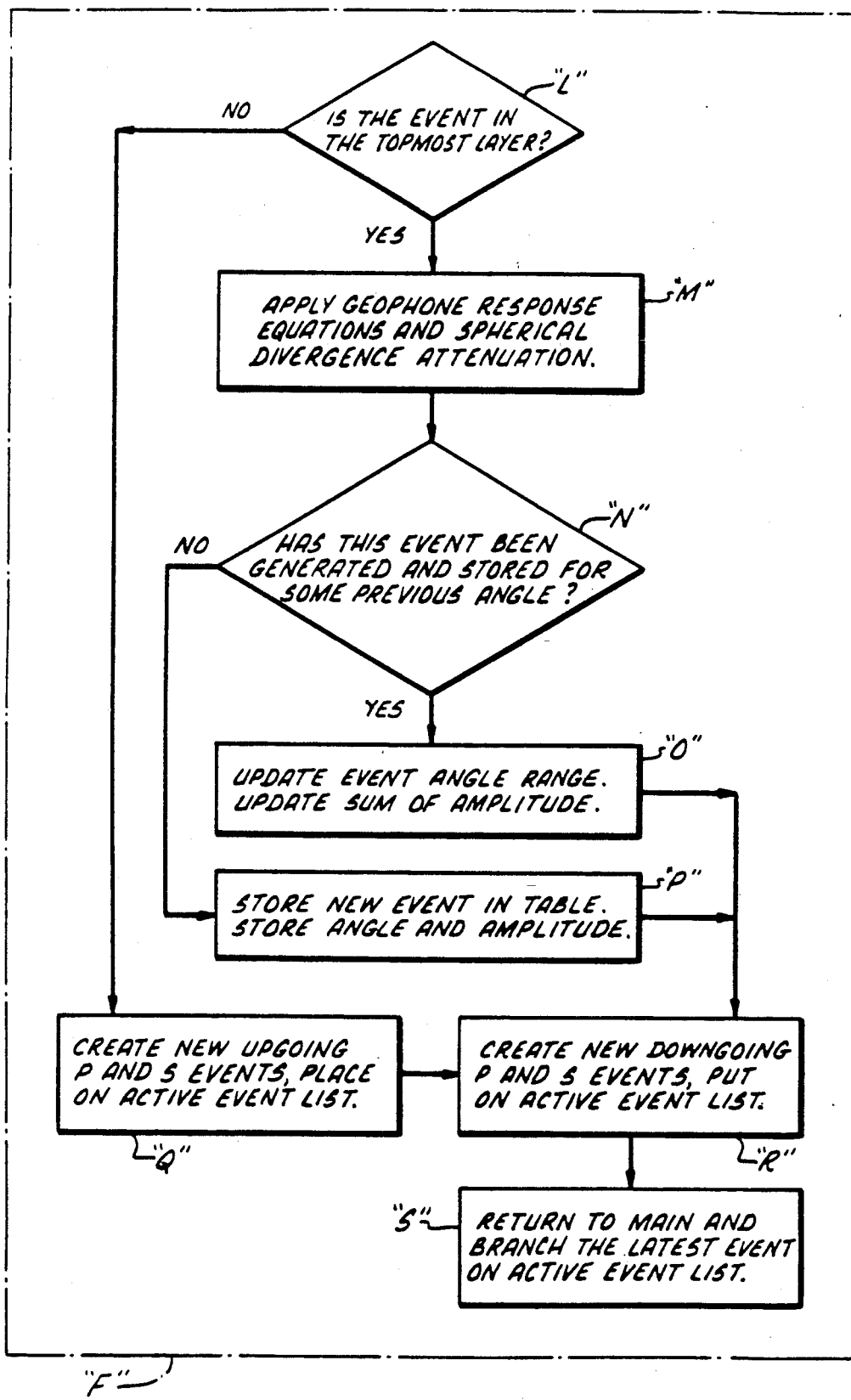

FIG. 3d shows an expansion of the output block "D" portion of the flowchart shown in FIG. 3a where velocity analysis and graphics are performed. For each event-/ray stored in the event history table, a complete move-out curve is generated in offset and time for the range of angles as shown in Block "T." This is accomplished as follows:

$$\text{Travel time, } t_i = \Sigma_{j=1}^m T(\theta_i, path_j) \quad (a)$$

$$\text{Offset, } O_i = \Sigma_{j=1}^m O(\theta_i, path_j) \quad (b)$$

where:
M = number of layers traversed by event E;
$\theta_i$ = $i^{th}$ angle of angle range of event E;
$path_j$ = $j^{th}$ layer and mode of event E;
T ($\theta_i$, $path_j$) = travel time in $j^{th}$ layer of the path of event E for source angle $\theta_i$; and
O ($\theta_i$, $path_j$) = offset in $j^{th}$ layer in path of event E for source angle $\theta_i$ At Block "U," the best fit hyperbola is calculated frmm the move-out curve. This gives the RMS Velocity and Zero-Offset Intercept Time. This is accomplished as follows:

$$V_{RMS} = [1/s]^{\frac{1}{2}}, \quad (a)$$

Intercept time, T = time intercept of best fit line at $O^2$ equal to zero. (b)

where:
S = slope of best-fit line through $O_i^2$ and $T_i^2$ offset-time pairs; and
O and T are as stated above.

At Block "V" previously calculated velocity and intercept times are searched for very similar events.

Level of similarity is set by user and is defined by tolerances in intercept time and $V_{RMS}$. These similar events/rays are grouped as one event to enhance analysis of major events. This grouping also simulates constructive (i.e., waves in phase and/or amplitude increasing) and destructive (i.e., waves out of phase and/or amplitude decreasing) interference, and is shown by a scatter-gram. A scatter-gram is defined as output data points posted within a two-dimensional data display window.

The grouped and non-grouped events (i.e., rays from significant lithological structures or interfaces) are plotted as a circle at the intercept of RMS Velocity and zero-offset time at Block "W." Zero-offset intercept time is defined as arrival time at a zero offset receiver. Absolute amplitude is represented as the area of the circle, larger circles representing higher amplitudes. The circles are labelled with an event number and are included on a separate output display for alternate reading.

Outputs can also be limited by the user. Ray primaries, mode conversions, multiples, spherical divergence, directional geophone response, and grouping increments in the synthetic seismic response can be avoided, limited and otherwise user controlled.

The output display can also show move-out curves. The display is generated by a calculation procedure (and, for VSP, a linking list, in which insertions, deletions and expansions of previously calculated signals are accomplished) to show travel path from the source.

This move-out curve display can also indicate the mode and type of event by color codes, e.g., multiples are green, p-wave primaries are blue, and shear waves are red.

Output can also incorporate error checking, program listing and detailed abend messages. For example, an error messages can be: directional geophone response is not valid for marine surveys. An example of an abend messages can be: Poisson ratio is not physically valid for a specified layer.

At Block "X," a listing of event number and history is prepared. History includes a complete travel path history, specifically including the parameters of source angle range. The output process step is then iterated for the next event stored in the event history table until all events have been grouped, plotted and listed on at least one output. Output means may be a multi-color printer, but video displays or microprocessor transmitting means to other outputs/programs are also possible.

Figure 4:
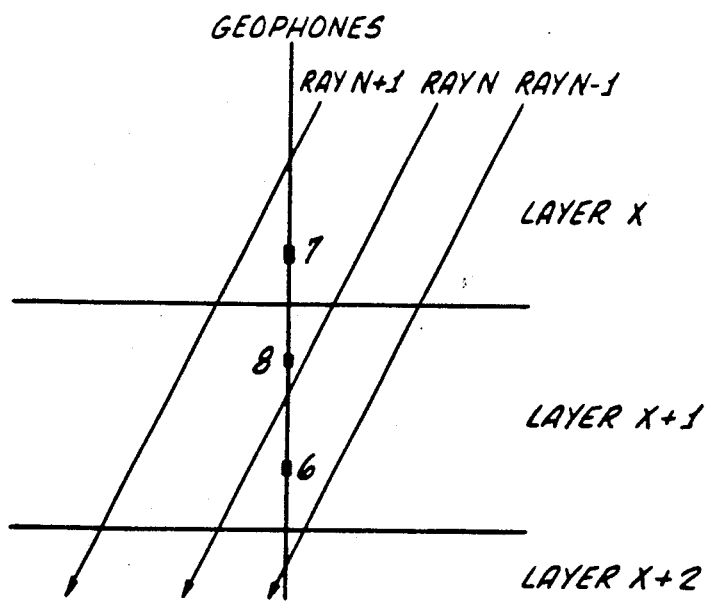
FIG. 4 shows a schematic view of sample seismic rays intersecting a Vertical Seismic Profiling array.

FIG. 4 illustrates an example of a Vertical Seismic profile (VSP) calculation process. Geophone adjacent segments 6, 7, and 8 are on a vertical line and are included on a linked list (see FIG. 5 for sample linked list chart). Segments are located in layers X and X+1. Adjacent discrete event/rays N−1, N, and N+1 bracket these geophone locations, similar to paired rays for a single receiver. Arrivals are calculated/generated for segments 6, 7, and 8, but are plotted in the output in the 6-8-7 linked order (or inverse order). Segment 6 is expanded to include segment 8 because the receivers are adjacent. Segment 8 is connected to segment 7 which is then expanded into expanded segment 6 by means of insertion in the linked list. Segment 7 can then deleted from the linked list to release processor memory.

Figure 5:
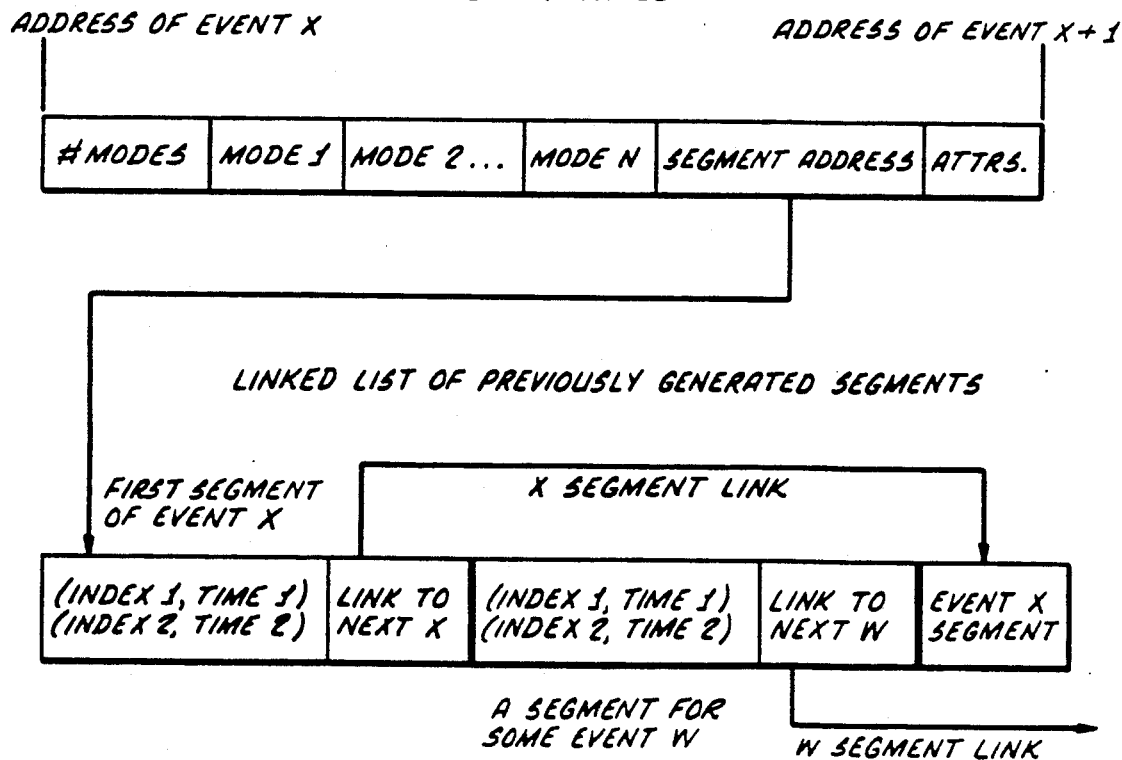
FIG. 5 is a chart showing a sample linked list and VSP table.

Linked list and VSP event table examples are shown in FIG. 5. The example shows VSP data structures for overlay curves. An overlay curve can be defined as an event's time-depth travel path. Address of each event X is stored in the VSP event table along with its resulting ray modes, segment address and attributes. The stored VSP event table data, specifically the segment address, is provided to a linked list. For each segment and each event, linkage and/or expansion is accomplished through the specified links.

The synthetic seismic results using this analysis method have been well matched to actual seismic data. Generally, VSP results show much more offset dependent behavior than surface seismogram results. This appears to be due to the large changes in angle of incidence with depth.

VSP data also appears to be better able to detect mode conversions and thin beds. Thin beds are layers having little depth when compared to typical layers. What may have been previously considered noisy data can be identified now as containing many types of events, such as many thin beds rather than a thick bed having average properties over these thin beds.

In operation, the threshold levels and output selections made by the user are optimized to match the lithology and actual geophone data (e.g., sensitivity, location, and directional orientation). Further optimization can be achieved by optimizing filtering of the actual data and further altering the model's threshold levels, output options, etc.

The numerical simulation can also be extended. This includes perturbation analysis and non-planar geological structure.

The invention satisfies the need to match synthetic data to actual seismic data in order to verify the lithology model and improve the chance of resource recovery if drilled. Improved matching is typically achieved without extensive model calculations by terminating insignificant rays/event calculations, avoiding multiple calculations of branched events, approximations by interpolating between incremental rays, and grouping output increments. High accuracy is achieved in a complete model capable of extensive calculations, but simplified to better match filtered seismic data, when required. Further advantages of the invention include: multiple output options, complete event history outputs, color coded and circular representation outputs, and highly reliable results.

Although the maximum and minimum depth the method can simulate is theoretically unlimited, the depth is typically limited to a range of from 0 to 9000 meters, preferably within the range from 100 to 6000 meters, most preferably within the range from 200 to 2500 meters. Similarly, the type of lithology structure that can be modeled is theoretically unlimited, the preferred application is to a series of nearly horizontal layers having essentially homogeneous properties.

Although the preferred embodiment of the invention is directed to natural resource exploration and recovery, such as oil, gas, geothermal, and minerals, alternative applications of the method are possible. The method can be applied to analyze non-destructive test (NDT) signals when testing for cracks or other flaws in materials or devices. NDT signal source may be sonic, ultrasonic or electromagnetic waves. Another application is for medical diagnosis of ultrasonic or other signals transmitted into a patient's body. The source and structure to be analyzed may also be the patient's vocal chords. Still other applications include underwater detection of objects, and hidden cavity or conduit detection in underground or surface structures.

Still other alternative embodiments are possible. These include: a 3-dimensional numerical simulation (obtaining a plurality of seismic signals outside of a 2-dimensional plane and 3-dimensional or multiple 2-dimensional modeling); a plurality of seismic sources and a corresponding simulation (e.g., source signals being radiated sequentially at different frequencies and detectors recording a series of signals); using discontinuous or other interpolation/curve fitting methods for critical angle applications (e.g., step change curve fitting methods or using a real part of complex amplitude calculations beyond a critical angle); after obtaining a model which generates synthetic seismic data comparable to actual data (indicating acceptable accuracy), perturbing the model to simulate resource recovery or other changes to the formation; and integrating gravity gradient or other exploration/sensor data into the output process, figures and graphs.

While the preferred embodiment of the invention has been shown and described, and some alternative embodiments also shown and/or described, changes and modifications may be made thereto without departing from the invention. Accordingly, it is intended to embrace within the invention all such changes, modifications and alternative embodiments as fall within the spirit and scope of the appended claims.

We claim:

1. A seismic signal analysis method for evaluating a property of a subterranean layer within a zone of interest containing outer layers, which method comprises the steps of:
   a) impressing a pressure wave on the zone of interest from a source located displaced from the zone of interest;
   b) placing a plurality of detectors each capable of sensing a pressure wave affected by at least a portion of said layer and producing a data signal, wherein at least one of said detectors is spaced apart from said source;
   c) detecting a plurality of said data signals from said sensors to form an actual sensed data set, wherein said data signals are above a first threshold amplitude;
   d) constructing an initial numerical model of said zone of interest;
   e) calculating synthetic pressure waves and a synthetic data set from said model, wherein said calculations are limited to synthetic waves having greater than a second threshold amplitude, wherein said second threshold amplitude is based upon said first threshold amplitude over a range of frequencies and said calculating also comprises paired raytracing and interpolation between said paired raytracing;
   f) comparing said synthetic data set with said actual data set to form a comparison value;
   g) modifying said numerical model based upon said comparison; and
   h) repeating steps e, f, and g until said comparison value indicates an acceptable accuracy.

2. The method of claim 1 wherein said layers are nearly horizontal.

3. The method of claim 2 wherein said interpolation uses a real part of complex amplitude calculations beyond a critical angle.

4. The method of claim 3 which also comprises the step of perturbing said model after said comparison value indicates an acceptable accuracy value.

5. The method of claim 4 wherein the step of limited calculation also comprises grouping said synthetic pressure waves.

6. The method of claim 5 wherein said data signals are filtered and wherein said first threshold amplitude is based upon said filtration of said data signals.

7. A remote exploration apparatus for investigation of a subsurface structure for the presence of a portion of the structure having commercially valuable properties, said apparatus forming a system comprising:
   a seismic wave generator;
   a seismic wave detector capable of generating a seismic signal representative of a seismic wave affected by said subsurface structure;
   numerical simulation means for modeling said subsurface structure and generating a synthetic seismic signal resulting from a synthetic seismic generator;
   comparison means for generating a difference indicator comparing said synthetic seismic signal and said seismic signal, wherein said model generally represents at least a portion of said subsurface structure when said difference is small;
   means for further exploring said subsurface structure when said simulation means for modeling includes said portion of the structure and when said comparison means generates said small difference; and
   wherein said numerical simulation means comprises means for calculating paired rays from a synthetic seismic wave.

8. The system of claim 7 wherein said model calculates said paired rays essentially simultaneously and also comprises means for grouping said paired ray calculations.

9. The system of claim 8 wherein said model also comprises means for terminating paired ray calculations when the amplitude of said grouped calculations is less than a threshold quantity.

10. The system of claim 9 wherein said said sensors have a minimum seismic signal sensitivity level and wherein said model also comprises means for setting said threshold quantity commensurate with said sensitivity level.

11. The system of claim 10 wherein said further exploring means comprises a drilling means for penetrating said subsurface structure.

12. The system of claim 11 wherein said small difference is less than said sensitivity level.

13. A seismic signal analysis method for evaluating a property of a substructure contained within a structure, which method comprises the steps of:
   a) impressing a wave on the structure from a wave source located spaced apart from said substructure;
   b) placing a plurality of detectors each capable of sensing at least a portion of said wave affected by said substructure and producing a data signal, wherein at least one of said detectors is spaced apart from said wave source;
   c) detecting a plurality of said data signals from said sensors to form an actual sensed data set, wherein the amplitudes of said data signals are above a first threshold level;
   d) constructing an initial numerical model of at said structure;
   e) calculating synthetic waves and a synthetic ray data set from said model, wherein said calculations are limited to synthetic discrete rays having greater than a second threshold amplitude wherein said calculating also comprises simultaneous paired calculating of synthetic discrete rays, wherein said paired rays are state-space vector representations located nearly adjacent to each other;

f) comparing said calculated data set with said actual data set;

g) perturbing said theoretical model based upon said comparison; and h) repeating steps e, f, and g until said comparing step indicates an acceptable accuracy value.

14. The method of claim 13 wherein said calculating step e also comprises avoiding multiple calculations of synthetic discrete rays overlapping the state-space of a first pair of said synthetic discrete rays.

15. The method of claim 14 wherein said calculating step e also comprises synthetic mode conversion of said synthetic discrete rays and also comprises limiting said synthetic ray mode conversions based upon a third threshold amplitude.

16. The method of claim 15 wherein said calculating step e also comprises a time and location-domain terminator of synthetic wave calculations.

17. The method of claim 16 wherein said calculating step e also comprises error checking of said synthetic rays.

18. The method of claim 17 which also comprises transmitting the synthetic ray representations to an output device.

19. The method of claim 18 wherein said transmitting step also comprises transmitting an event history capable of being color coded by said output device.

20. The method of claim 19 wherein said event history transmitting is also capable of being represented by circles having diameters representative of event amplitude by said output device.

21. The method of claim 20 wherein said substructure is located from 200 to 2500 meters from said wave source and wherein said placing step b also comprises locating said detectors within a cavity having an essentially vertical major axis and penetrating said structure.

* * * * *